(12) United States Patent
Bavant et al.

(10) Patent No.: US 7,120,154 B2
(45) Date of Patent: Oct. 10, 2006

(54) METHOD FOR THE ROUTING OF IP FRAMES BETWEEN THE USERS OF A VARIABLE GRAPH NETWORK (76) Inventors: Marc Bavant, 21 Rue Clavel, 75019 Paris (FR); Michel Delattre, 95 Rue de Bellevue, 92100 Boulogne (FR)

( * ) Notice: Subject to any disclaimer, the term of this patent is extended or adjusted under 35 U.S.C. 154(b) by 999 days.

(21) Appl. No.: 09/895,324

(22) Filed: Jul. 2, 2001

(65) Prior Publication Data
US 2002/0051452 A1 May 2, 2002

(30) Foreign Application Priority Data
Jun. 30, 2000 (FR) .................. 00 08514

(51) Int. Cl.
H01L 12/28 (2006.01)
(52) U.S. Cl. ............ 370/395.53; 370/395.54; 370/400; 370/401; 370/402
(58) Field of Classification Search ........ 709/238–244; 370/395.5–395.54, 389–401, 474–475
See application file for complete search history.

(56) References Cited

U.S. PATENT DOCUMENTS

| | | | |
|---|---|---|---|
| 5,600,644 A * | 2/1997 | Chang et al. ............ 370/404 |
| 5,777,994 A | 7/1998 | Takihiro et al. |
| 5,920,699 A * | 7/1999 | Bare .......................... 709/225 |
| 5,949,783 A * | 9/1999 | Husak et al. ............. 370/396 |
| 6,144,978 A | 11/2000 | Bavant |
| 6,223,149 B1 * | 4/2001 | Margulis et al. ........... 703/27 |
| 6,345,055 B1 * | 2/2002 | Frick et al. ................. 370/467 |
| 6,671,281 B1 * | 12/2003 | Tsuda ........................ 370/396 |
| 6,798,775 B1 * | 9/2004 | Bordonaro et al. ....... 370/392 |
| 6,907,469 B1 * | 6/2005 | Gallo et al. ............... 709/238 |
| 2002/0018489 A1 * | 2/2002 | Ambe et al. .............. 370/475 |
| 2002/0145977 A1 * | 10/2002 | Delattre et al. .......... 370/235.1 |
| 2002/0186705 A1 * | 12/2002 | Kadambi et al. ........... 370/452 |
| 2005/0036488 A1 * | 2/2005 | Kalkunte et al. ........... 370/389 |

OTHER PUBLICATIONS

U.S. Appl. No. 09/895,324, filed Jul. 02, 2001, pending.
U.S. Appl. No. 10/083,128, filed Feb. 27, 2002, pending.
U.S. Appl. No. 09/175,478, filed Oct. 20, 1998, pending.
U.S. Appl. No. 09/147,511, Jan. 12, 1999, pending.
U.S. Appl. No. 09/147,510, filed Jan. 12, 1999, pending.
U.S. Appl. No. 09/147,667, filed Feb. 10, 1999, pending.
U.S. Appl. No. 09/284,248, Apr. 15, 1999, pending.
U.S. Appl. No. 09/530,948, May 15, 2000, pending.

(Continued)

*Primary Examiner*—Hassan Kizou
*Assistant Examiner*—Habte Mered
(74) *Attorney, Agent, or Firm*—Christensen O'Connor Johnson Kindness PLLC (57) ABSTRACT

Disclosed is a carrier network fulfilling a distributed virtual routing function, said carrier network comprising one or more components, each of the components comprising at least two nodes communicating with one another by means of an artery, a node comprising a an access function. At least one component of said network comprises the following elements:

several bridge ELANs, each bridge ELAN being connected to a virtual network VLAN,
at least one transit ELAN, all access functions of the same component being adjacent through said transit ELAN, and
at the level of an access function:
router LEC means adapted to connect the access function to at least one bridge ELAN associated with a VLAN
means for the identification of the VLANs serviced by the access function,
means (transit LEC) to connect the transit ELAN to the access function.

12 Claims, 4 Drawing Sheets

OTHER PUBLICATIONS

Xiaoqiang Chen, et al., "Evolution of ATM Internetworking," Bell Labs Technical Journal, vol. 2, No. 2, Mar. 21, 1997, pp. 82-110 (XP 000695170).

S. Knight, et al., "Virtual Router Redundancy Protocol," Available on the Internet, Apr. 1998, pp. 1-27 (XP 002135272).

Steven S. King, "Switched Virtual Internetworking Moves Beyond Bridges and Routers," Data Communications, vol. 23, No. 12, Sep. 1, 1994, pp. 66-70, 72, 74, 76, 78, 80 (XP 000462385).

* cited by examiner

METHOD FOR THE ROUTING OF IP FRAMES BETWEEN THE USERS OF A VARIABLE GRAPH NETWORK

BACKGROUND OF THE INVENTION

1. Field of the Invention

The present invention relates to a virtual router distributed over a carrier network and a method for the routing of packets among several virtual local area networks relying on a switching network whose graph may be variable owing to the mobility of its nodes.

The expression "distributed virtual router" is used to designate the routing method. The underlying switching network is also known as a "carrier network".

The nodes of the network communicate with one another for example by means of arteries whose configuration or existence may evolve over time, leading to a mobility of the nodes.

The invention can be applied especially to IP format packets of the Internet protocol.

The present invention can be applied for example in ATM type networks.

It can be applied to the emulation of routing in all networks using switching techniques.

2. Description of the Prior Art

In the prior art, the routing is done by means of a piece of equipment known as a router that relays the packets entering a junctor of this equipment towards an output junctor as a function of the destination IP address of the packet and as a function of the routing table.

When the routing is done between a large number of local area networks at very great distances from one another, a meshed network of routers consisting of access routers and transit routers is generally used.

A configuration of this kind has certain drawbacks, especially the following ones:

1) the transit time of a packet in the network is adversely affected by the large number of routers to be crossed, 2) the notion of quality of service (QoS) is not taken into account.

One way to overcome the above-mentioned drawbacks consists for example in integrating the IP routing (level 3) with a switching technology (level 2) such as the ATM (asynchronous transfer mode) switching. Three lines of development have been emphasized.

For example, what is called the gigarouter technology achieves a routing function at the core of a switch in taking account of the destination IP address in the switching process. In the ATM context, the destination IP address is taken into account during the translation of logic channels.

The label-switching technology identifies the flows within the IP traffic by a process of signalling associated with these flows of labels used by the level 2 switching. Applied to the ATM, a logic path indicator VPI/VCI is associated with a flow. This technology is being standardized at the IETF under the name of multiprotocol label switching (MPLS).

The technology known as "local area network and routing emulation" is used to create virtual circuits that directly connect the communications applications (short circuits) in using a specific protocol that defines customer entities, server entities, connections between these entities and rules for making short circuits between customers. In the ATM context, this technology is covered by a standard known as local area network emulation (LANE) and multiprotocol over ATM or MPOA.

This technology relies on the implementation of essential centralized functions of servers, flow routers with short lifetimes capable of being duplicated or even triplicated to provide minimum redundancy. However, when the network is subdivided into several non-interconnected components, there is no certainty that each component will have all the functions essential to the service nor that when two networks are combined, the redundant functions (offered by each of the components taken individually) will merge harmoniously, namely transparently for the user.

The object of the invention relates especially to a method of routing between virtual local area networks when the underlying switching network has a graph that may be variable owing to the mobility of its nodes, the network possibly being constituted by several components. A component is defined as a sub-network comprising at least two nodes that communicate with each other by arteries.

The number of components may be equal to the numbers of switches of the network.

SUMMARY OF THE INVENTION

The invention relates to a carrier network fulfilling a distributed virtual routing function, said carrier network comprising one or more components, each of the components comprising at least two nodes communicating wit one mother by means of an artery, a node comprising an access function. It is characterized in that at least one component of said network comprises the following elements:

several bridge ELANs, bridge ELAN being connected to a virtual network VLAN, at least one transit ELAN, all access functions of the same component being adjacent through said transit ELAN, and at the level of an access function:

router LEC means adapted to connect the access function to at least one bridge ELAN associated with a VLAN, means for the identification of the VLANs serviced by the access function, means (transit LEC) to connect the transit ELAN to the access function.

The invention also relates to a method of routing in a switched network comprising one or more components, the component or components comprising at least two nodes connected by a communications artery, each of the nodes comprising an access function. It is characterized in that it comprises at least one step where the access function relays the data packets received on a router LEC or a transit LEC as follows:

(a) if the addressee of the packet is an internal routing function laid out at a node X, the packet is directly handed over to said function, (b) if the addressee of a packet is a VLAN serviced by the access function, the data packet is relayed to the router LEC of the node X corresponding to the VLAN serviced, and (c) if the addressee of the packet is a VLAN that is not serviced, the packet is relayed on a transit ELAN via the transit LEC of a node X to the transit LEC of a node Y.

The step (b) may be carried out as follows:

if the addressee VLAN belongs to the list, the relaying function of the access function is activated and the data packet is relayed to the router LEC having an identifier that is the identifier of the addressee VLAN, and the step (c) may be carried out as follows:
if the addressee VLAN does not belong to the list, the data packet is relayed to the transit LEG of a node Y as mentioned in the routing table.

The present invention comprises especially the following advantages:
it provides users of non-interconnected components with a routing service equivalent to the one offered by the complete network,
in the case of the merger of several components, it enables the merger without redundancy of the functions.

BRIEF DESCRIPTION OF THE DRAWINGS

Other features and advantages of the invention shall appear from the following description given by way of an illustration that in no way restricts the scope of the invention, with reference to the appended figures, of which.

MORE DETAILED DESCRIPTION

The method according to the invention or "distributed virtual router" is designed especially to offer a routing service among several virtual local area networks or VLANs relying on a switching network whose graph is variable owing to the mobility of its nodes.

Indeed, in the course of time, the switching network is capable of getting split up into numerous non-interconnected components, a component being formed for example by several nodes communicating by means of arteries, and/or of getting extended by the interconnection of such components. At the most, the splitting up of a network may lead to a number of components equal to the number of switches or nodes of the network.

The description given here below by way of a non-restricted illustration relates to an ATM support network and can be applied to the emulation of IP packet routing. It can also be used in all networks implementing other switching and routing technologies.

Figure 1:
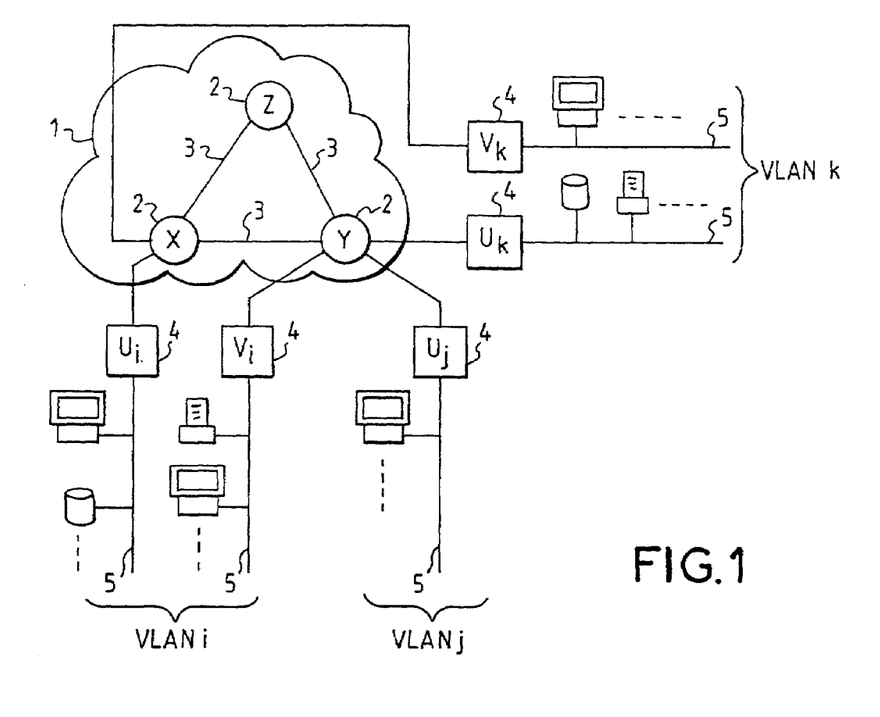
FIG. 1 shows a general view of a network.

FIG. 1 shows a view of an ATM network 1 (level 2) comprising several switches 2 (corresponding for example to the nodes X, Y and Z of the network) and several arteries 3, each of the arteries connecting two switches, This network has the function especially of interconnecting different items of equipment 4 in local area network emulation mode. These different items of equipment 4 fulfill the role of passageways between several ethernet networks 5, referenced Ui, Vi, Uk, and Vk to which they are connected and the ATM network 1. Various stations can be connected to each ethernet network.

An ethernet network designated by an identifier i, j, . . . is connected to a VLAN designated by the same identifier.

Thus, in the example of FIG. 1, the networks Ui and Vi correspond to the same VLANi, the networks Uj to the VLANj and the networks Uk, Vk to the VLANk.

The ATM network 1 provides a bridge service according to the prior art, for example between the different networks belonging to one and the same VLAN and a routing service according to the invention, for example between the three VLAN networks VLANi, VLANj and VLANk.

Figure 2:
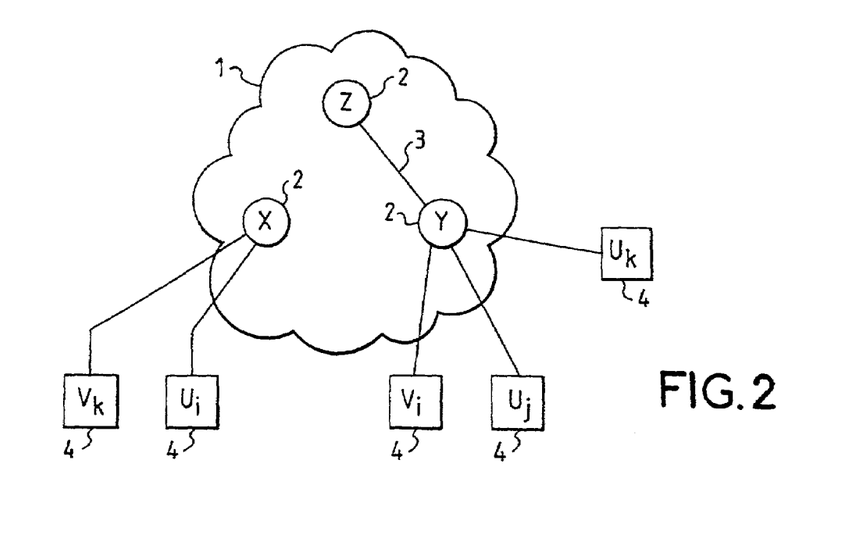
FIG. 2 shows a general view of the network of FIG. 1 after splitting into two components.

FIG. 2 shows a network comprising elements identical to those described in FIG. 1 and having the same references, wherein the node X is isolated from the rest of the network. The nodes Y and Z are connected by a communications artery 3. The network has two components, a first component comprising the node X that is isolated and a second component comprising the two nodes Y and Z and the communications artery 3.

FIG. 2 shows a network comprising elements identical to those described in FIG. 1 and having the same references, wherein the node X is isolated from the rest of the network. The nodes Y and Z are connected by a communications artery 3. The network has two components, a first component comprising the node X that is isolated and a second component comprising the two nodes Y and Z and the communications artery 3.

The object of the invention especially is to propose an adapted switch architecture to provide intercommunication services between the networks within each component, namely the routing between Ui and Vk in the first component and the routing between Vi, Uj and Uk in the second component.

Figure 3:
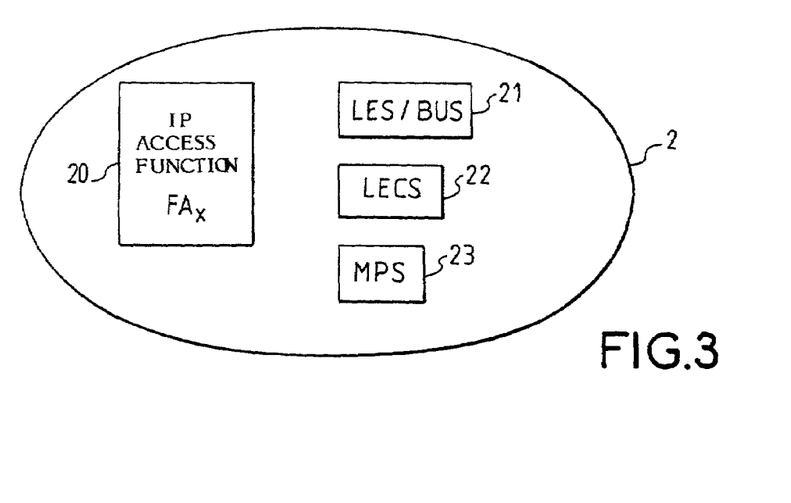
FIG. 3 shows an architecture of a switch according to the invention.
Figure 4:
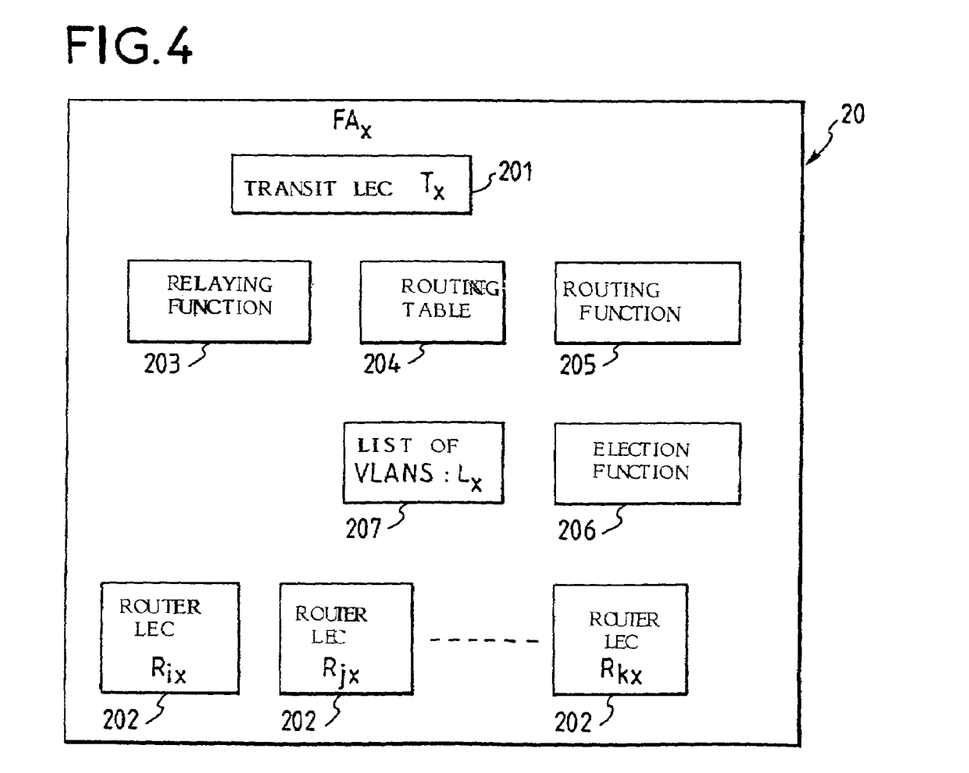
FIG. 4 shows an IP access function according to the invention.

The switch 2 described in detail in FIG. 3 comprises for example:
an IP access function 20 according to the invention described in detail in FIG. 4,
a LES/BUS (LAN emulation server/broadcast or unknown server) function 21,
a LECS (LAN emulation configuration server) function 22, and
an MPS (MPOA server) function 23.

The latter three functions are designated in the description for reasons of simplification by the expression "server function" and have characteristics known in the prior art.

FIG. 4 gives a detailed view of an exemplary embodiment of a IP access function 20 implanted in a node and having characteristics according to the invention.

This IP access function 20, referenced by the acronym FAx where the index x corresponds to the node concerned, in this case the node X, comprises for example:
a transit LEC 201 referenced Tx having the index of the node concerned, LEC being the abbreviation of LAN emulation client,
n router LECs 202 referenced Rix where n is the number of VLANs, i corresponding to the identifier of the VLAN and x to the index of the node concerned,
a relaying function 203 that receives the IP packet and processes it as a function of its header; for example it modifies the header and re-sends the packet,
a routing table 204 containing the routing data,
a routing function 205,
an election function 206 used to assign the servicing of each VLAN to a single access function, and
a list Lx 207 of VLANs serviced.

These different elements and their interactions with the network are explained here below.

Transit LEC 201

The ATM support network comprises for example an emulated LAN (ELAN) known as a transit ELAN for which all the IP access functions are clients by means of a LEC function known as a "transit LEC". For example, the transit LEC function of the access function of the node X is referenced LEC Tx. Those of the nodes Y and Z are respectively referenced LEC Ty and LEC Tz. The transit LEC is connected to the transit ELAN.

Router LEC 202

Each VLAN has an associated single emulated LAN in the carrier network. This LAN is called a bridge ELAN. All its access functions are clients by means of a LEC function (LAN emulation client) called a router LEC. A bridge ELAN is designated like the VLANs by an identifier i, j, . . . .

For example, the IP access function FAx of the node X is a client of each bridge ELAN, ELANi associated with the VLANi by means of the router LEC Rix.

Lx List 207

This list has the function especially of identifying the VLANs serviced by the access function FAx.

The constitution of a list Lx is performed for example as follows: for a given component of a network comprising m nodes having an identifier x, y, . . . and therefore m lists Lm, the intersection any two of the lists Lm corresponds to the empty set.

Figure 5:
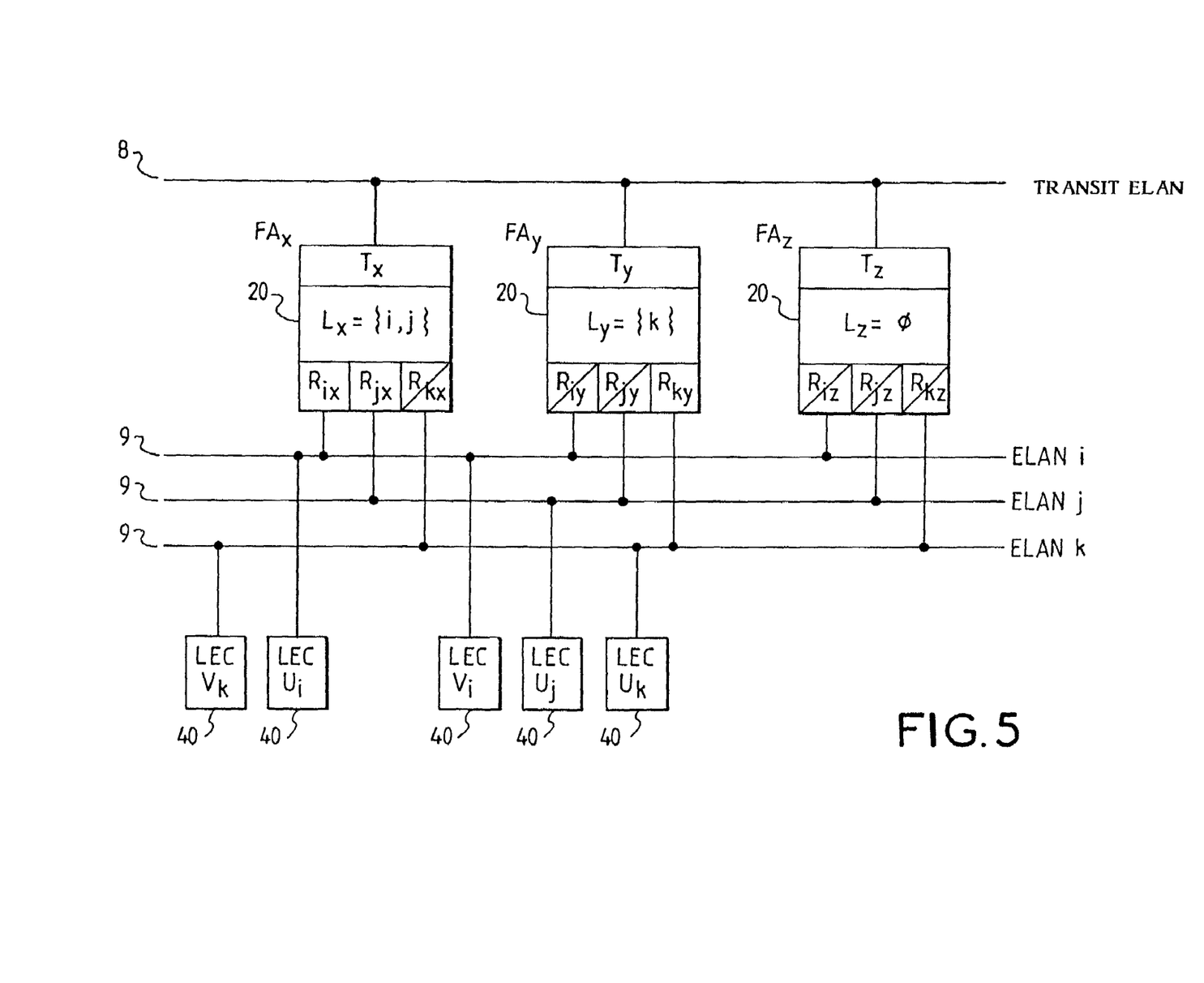
FIG. 5 shows an exemplary architecture of a distributed virtual router according to the invention.

In the example given in FIGS. 1 and 5 where the component of the network considered has three nodes referenced X, Y and Z, the corresponding lists Lx, Ly and Lz are determined so that when one of them takes any two of the three lists, their intersection is equal to $\phi$. In this example, for the node X, Lx={i, j}, for the node Y, Ly={k} and for the node Z, Lz={ }.

It is possible to use an election protocol known to those skilled in the art, for example the VRRP protocol standardized at IETF under reference RFC 2338.

The implementation of the election protocol is for example ensured by the election function 206 implanted in each access function FAx, FAy, FAz and engaging in dialog with the corresponding functions of the other nodes forming part of the same component of the network, by exchange of packets on the bridge ELANs through the router LECs Rix mentioned.

Routing and Relaying Functions and the Routing Table

The IP access functions, FAx, FAy . . . implement a routing function and a relaying function as well as a routing table known in the prior art.

The routing function 205 sustains a routing table 204 by means of a dialog with the homologous routing functions through a routing protocol.

The relaying function 203 enables the relaying of any packet coming from an ELAN towards another ELAN as a function of its destination IP address and of the information contained in the routing table.

From the routing point of view, all the IP access functions of one and the same component are adjacent through the transit ELAN. The routing protocol uses the transit ELAN to broadcast the routing information to the corresponding units towards the bridge ELANs, ELANi, ELANj, . . . where i, j belong to the Lx lists defined, using the principle mentioned here above, through the associated router LECs.

A principle of implementation of an access function implanted in the node, for example FAx implanted in the node X, may be as follows:

The access function IP FAx relays for example all the IP packets received on the router LECs, LEC Rix where i belongs to Lx on the basis of the destination IP address and the information contained in the routing table.

If the destination of the IP packet is a function internal to the access function FAx, such as the election function or the routing function, the IP packet is forwarded directly to this internal function.

Else.

If the destination VLAN j for example belongs to the list Lx of the addressee VLANs, the access function FAx activates its relaying function 203 in order to relay the IP packet to the router LEC Rjx of the node x linked with the ELAN j connected to the VLANj.

If the destination VLAN j does not belong to the list Lx, it is not part of the VLANs serviced by the node X, the IP packet is relayed to the transit LEC Tx which sends it on the transit ELAN towards a transit LEC indicated in the routing table (known by the expression "next hop") for example Ty, the transit LEC of the node Y.

The router LECs Rmx of the node x where the identifier m does not belong to the list Lx remain inactive, for example Rkx in FIG. 5. In this case, only the destination packets IP of the internal election function are accepted.

The access function FAx also relays all the IP packets received on the transit LEC Tx by using the IP destination address and the information contained in the routing table.

If the addressee of the IP packet is the internal routing function 205 laid out in the node X, the IP packet is forwarded directly to this function.

If the packet is destined for a VLANi serviced by the access function FAx, namely it belongs to the list Lx, the packet is relayed to the router LEC of the access function having an identifier index i of the VLAN and the index x of the node, Rix.

If the packet is intended for a VLAN not serviced by the access function (the identifier i of the VLAN does not belong to the list Lx), the access function FAx relays the packet in taking account of the information contained in the routing table 204 to the transit ELAN.

Each VLANm having an identifier m has one or more points of access to the routing service by means of LEC functions of the corresponding bridge ELAN, ELANm, associated with the VLANm. These LEC functions are named "user LEC".

For example, the VLANi has several LECs designated by LEC Ui, LEC Vi that are physically connected to any nodes of the carrier network, these LECs forming part of the bridge ELAN having an identifier i.

Certain user LECs could be internal to a node of the network when this network provides ethernet access.

Short circuits enabling the exchange of data flows for sufficiently lengthy periods are automatically set up by MPOA (multiprotocol over ATM).

FIG. 5 gives an exemplary view of an architecture of the distributed virtual router according to the invention in a component of the network.

The distributed virtual routing function is achieved for example by a community of several IP access functions 20 referenced FAx, FAy, FAz, . . . connected to one another in local area network emulation by a transit ELAN 8 and by n bridge ELANs 9 designated ELANi, ELANj, ELANk where n is the number of VLANs and i is the identifier of a VLAN.

In each switch for example the switch X, the transit LEC Tx is connected to the transit ELAN 8 and the router LECs Rix, Rjx, Rkx are each connected to a corresponding bridge ELAN ELANi, ELANj, ELANk.

For the switch Y, the transit LEC is connected to the transit ELAN 8 and each router LEC is connected to the corresponding ELAN Riy at ELANi, Rjy at ELANj, Rky at ELANk.

For the switch Z, the transit LEC is connected to the transit ELAN 8 and each router LEC is connected to the corresponding ELAN Riz at ELANi, Rjz at ELANj, Rkz at ELANk.

The only elements activated are the router LECs Rix such that i belongs to Lx, the list of serviced VLANs being contained in the table 207 (FIG. 4).

In the example given Lx={i, j}, Ly={k} and Lz corresponds to the vacant assembly. This architecture is compatible with the network described in FIG. 1. The non-activated router LECs are designated by a cross Rkx, Riy, Rjy, Riz, Rjz, and Rkz.

Figure 6:
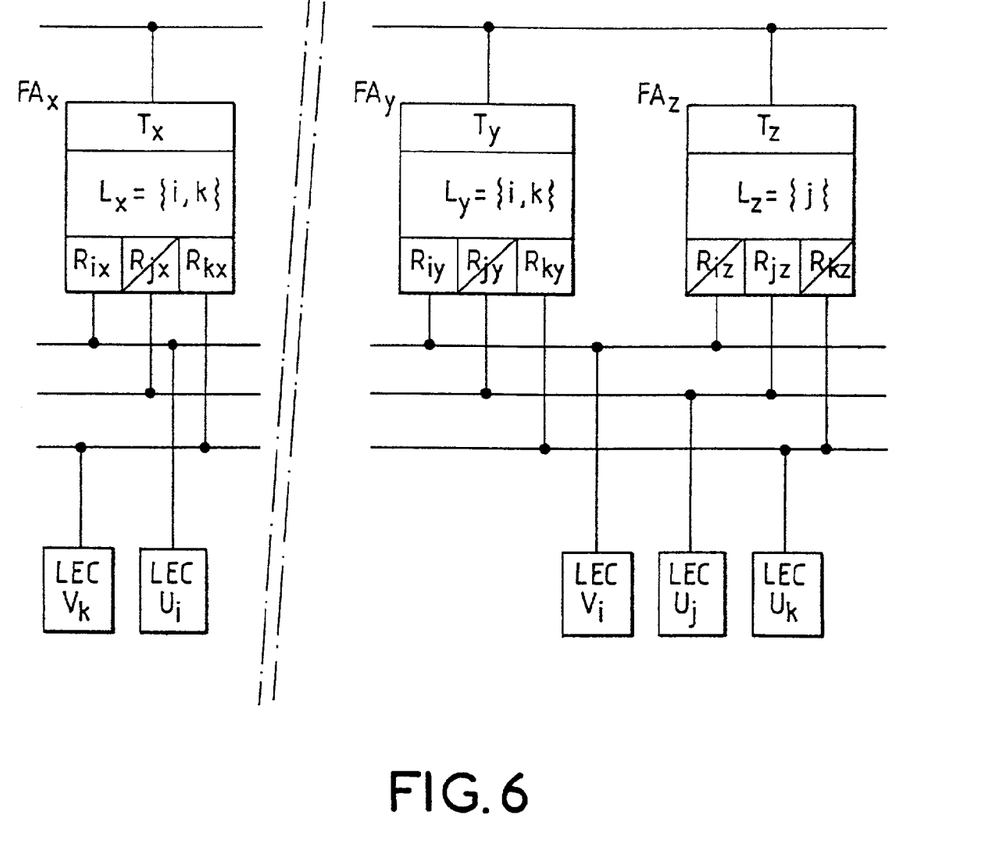
FIG. 6 is an architecture of a router after the splitting of the architecture described in FIG. 5.

FIG. 6 shows an exemplary architecture of the distributed virtual router when the network is subdivided into two components as shown in FIG. 2.

The following table describes the table of actions to be performed upon reception of a packet of the node X.

| Receiver LEC | Destination packet | Action |
| --- | --- | --- |
| <all except LEC Tx> | Election function | Forward to the election function |
| Rix, Rjx or Tx | Routing function | Forward to the routing function |
| Rix or Tx | User of ELAN j | Relay towards Rjx |
| Rix, Rjx or Tx | User of ELAN k | Relay towards Tx (next hop Ty) |
| Rjx or Tx | User of ELAN i | Relay towards Rix |
| In all other cases: | | Destroy the packet |

In all the exemplary embodiments described here above, the carrier network may be a network with level (2) according to the technology known to those skilled in the art.

What is claimed is:

1. A carrier network fulfilling a distributed virtual routing function, said cattier network comprising one or more components, each of the components comprising at least two nodes communicating with one another by means of an artery, each node comprising an access function, wherein at least one component of said network comprises the following elements:
   several bridge ELANs, each bridge ELAN being connected to a virtual network VLAN,
   at least one transit ELAN, all access functions of the same component being adjacent through said transit ELAN, and
   at the level of an access function:
      router LEC means adapted to connect the access function to at least one bridge ELAN associated with a VLAN,
      means for the identification of the VLANs serviced by the access function,
      means (transit LEC) to connect the transit ELAN to the access function.

2. The carrier network of claim 1, wherein the identification means is a list, wherein for a component of the network comprising m nodes, said list is one of m lists, said m lists defined so that the intersection of any two of the lists provides an empty set.

3. The carrier network of claim 1, wherein said access function comprises an election function, said election function interfacing with corresponding election functions of other nodes by exchange of packets on the bridge ELANs using the router LEC means.

4. The carrier network of claim 3, wherein said election function ensures implementation of an election protocol.

5. The carrier network of claim 1, wherein a VLAN comprises at least one LEC user connected to a node of the carrier network.

6. The carrier network of claim 5, wherein the LEC user function is implanted in a node of the carrier network for ethernet type access operations.

7. The carrier network of claim 1 wherein the carrier network is an ATM type carrier network with IP type data packets.

8. A method of routing in a switched network comprising one or more components, the component or components comprising at least two nodes connected by a communications artery, each of the nodes comprising an access function, wherein the method comprises relaying data packets received on a router LEC or a transit LEC using the access function as follows:
   (a) if the addressee of a packet is an internal routing function laid out at a node X, the packet is directly handed over to said function,
   (b) if the addressee of a packet is a VLAN serviced by the access function, the data packet is relayed to the router LEC of the node X corresponding to the VLAN serviced, and
   (c) if the addressee of a packet is a VLAN that is not serviced, the packet is relayed on a transit ELAN via the transit LEC of a node X to the transit LEC of a node Y.

9. The method of claim 8,
   wherein said access function comprises a list of identifying VLANs serviced, a routing table, and a relaying function, and
   wherein the step (b) is carried out as follows:
      if the addressee VLAN belongs to the list, the relaying function of the access function is activated and the data packet is relayed to the router LEC having an identifier that is the identifier of the addressee VLAN, and
   wherein the step (c) is carried out as follows:
      if the addressee VLAN does not belong to the list, the data packet is relayed to the transit LEC of a node Y as mentioned in the routing table.

10. The method of claim 8 or 9, wherein the data packet data packets relayed using the access function are received from the router LEC implanted in an access function.

11. The method of claim 8 or 9, wherein the data packets relayed using the access function are received from the transit LEC implanted in an access function.

12. The routing method of claim 8, wherein the switched network is an ATM type carrier network with IP data packets.

* * * * *

UNITED STATES PATENT AND TRADEMARK OFFICE
CERTIFICATE OF CORRECTION

PATENT NO. : 7,120,154 B2  Page 1 of 1
APPLICATION NO. : 09/895324
DATED : October 10, 2006
INVENTOR(S) : M. Bavant et al.

It is certified that error appears in the above-identified patent and that said Letters Patent is hereby corrected as shown below:

| COLUMN | LINE | ERROR |
|---|---|---|
| 2 | 26 | "wit" should read --with-- |
| 2 | 27 | "mother" should read --another-- |
| 2 | 30 | "ELANS, bridge" should read --ELANS, each bridge-- |
| 3 | 3 | "LEG" should read --LEC-- |
| 3 | 10 | "functions." should read --functions offered.-- |
| 3 | 55 | "switches, This" should read --switches. This-- |
| 3 | 59 | "Vi, Uk," should read --Vi, Uj, Uk,-- |
| 4 | 14-21 | delete as duplicative |
| 7 (Claim 1, | 41 line 2) | "cattier" should read --carrier-- |

Signed and Sealed this

Twelfth Day of August, 2008

JON W. DUDAS
*Director of the United States Patent and Trademark Office*